(12) United States Patent
Eshima et al.

(10) Patent No.: US 9,194,761 B2
(45) Date of Patent: Nov. 24, 2015

(54) CABLE CONDITION MONITORING DEVICE

(71) Applicant: Hitachi Cable, Ltd., Tokyo (JP)

(72) Inventors: Hirotaka Eshima, Hitachi (JP); Fumihito Oka, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 274 days.

(21) Appl. No.: 13/788,427

(22) Filed: Mar. 7, 2013

(65) Prior Publication Data
US 2014/0109655 A1 Apr. 24, 2014

(30) Foreign Application Priority Data

Oct. 19, 2012 (JP) ................................. 2012-231534

(51) Int. Cl.
*G01M 3/22* (2006.01)
*G01M 3/28* (2006.01)

(52) U.S. Cl.
CPC ............ *G01M 3/221* (2013.01); *G01M 3/2838* (2013.01)

(58) Field of Classification Search
CPC .................................................... G01M 3/2838
USPC ........................................... 73/40.7; 324/514
See application file for complete search history.

(56) References Cited

U.S. PATENT DOCUMENTS

| 1,999,771 | A | * | 4/1935 | Mample | ......................... | 137/317 |
| 3,086,069 | A | * | 4/1963 | Kolmorgen | ................. | 174/11 R |
| 5,608,159 | A | * | 3/1997 | Carcone et al. | ................ | 73/49.8 |
| 2011/0011163 | A1 | * | 1/2011 | Cote et al. | ..................... | 73/40.7 |

FOREIGN PATENT DOCUMENTS

| JP | H 03-123243 U | 12/1991 |
| JP | 2003-1433 A | 1/2003 |
| WO | WO 2009076750 A1 * | 6/2009 |

OTHER PUBLICATIONS

Japanese Office Action dated Aug. 4, 2015 with an English translation thereof.

* cited by examiner

*Primary Examiner* — Hezron E Williams
*Assistant Examiner* — Mark A Shabman
(74) *Attorney, Agent, or Firm* — McGinn IP Law Group, PLLC

(57) ABSTRACT

A cable condition monitoring device for monitoring a damaged condition of a cable including a conductor part including a plurality of element wires and an insulating material part formed on a periphery of the conductor part includes a gas feeding device configured to feed a compressed gas into the conductor part, a pressure gauge configured to measure a pressure in the conductor part, and an insulating material part damage judgment part configured to judge whether the insulating material part is damaged or not based on the pressure measured by the pressure gauge.

5 Claims, 2 Drawing Sheets

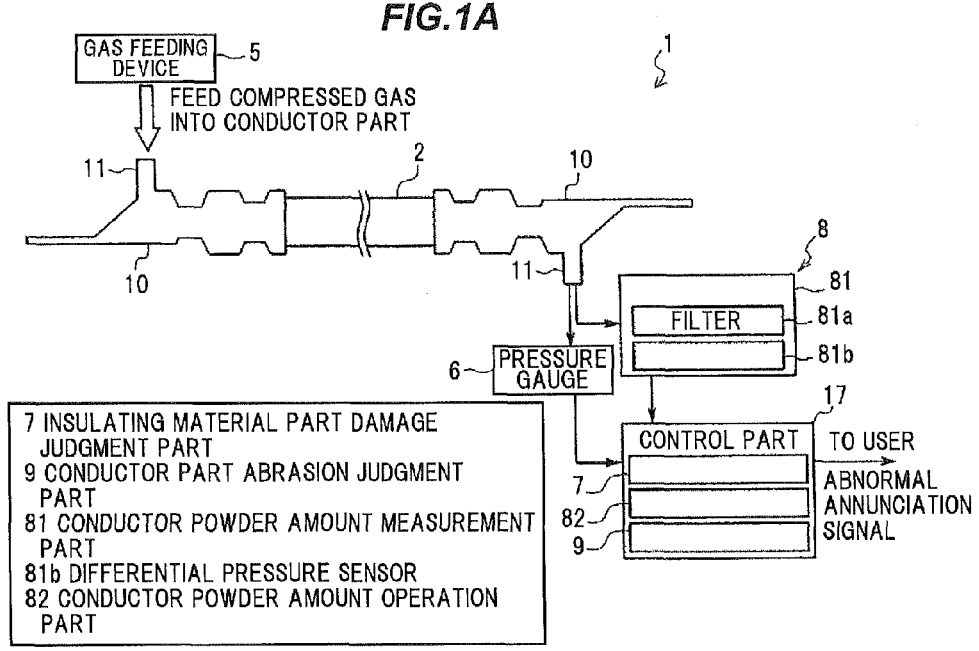
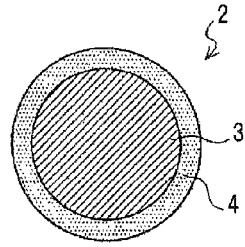
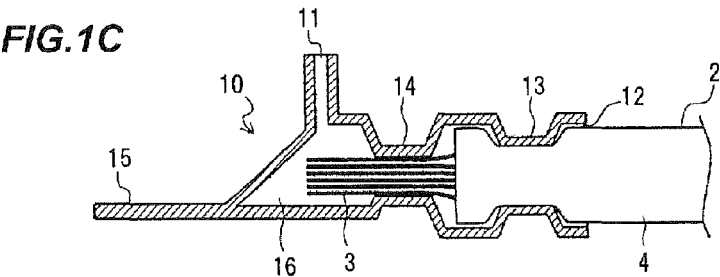

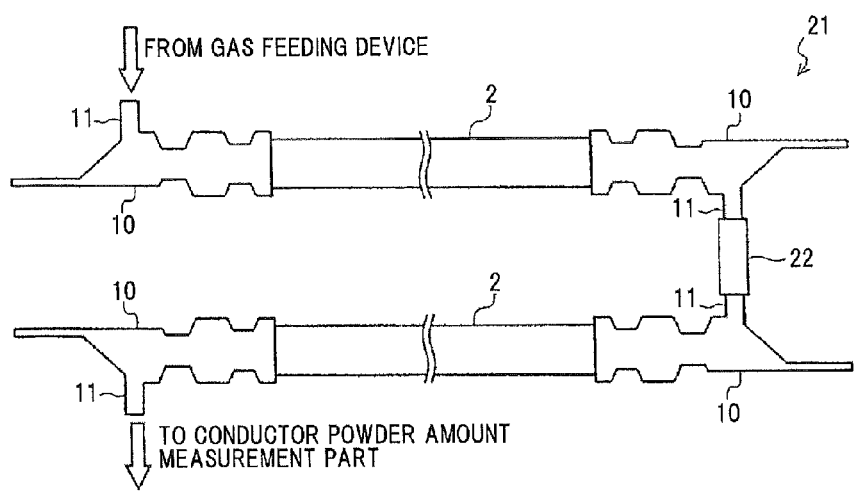
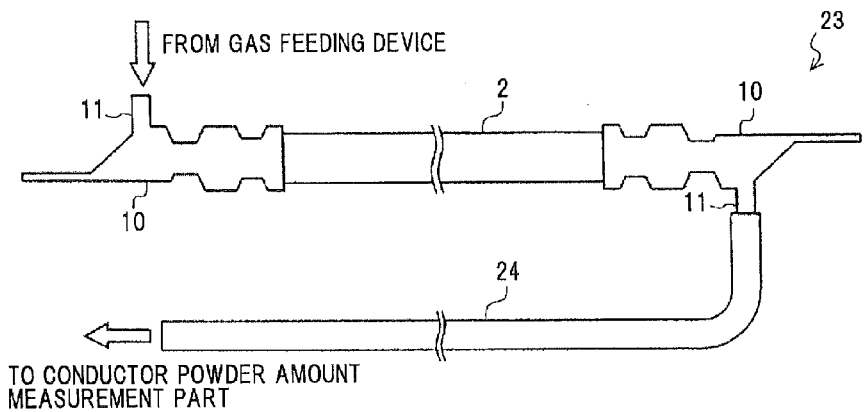

CABLE CONDITION MONITORING DEVICE

The present application is based on Japanese patent application No. 2012-231534 filed on Oct. 19, 2012, the entire contents of which are incorporated herein by reference.

BACKGROUND OF THE INVENTION

1. Field of the Invention

This invention relates to a cable condition monitoring device configured to monitor a damaged condition of a cable.

2. Description of the Related Art

In case of a cable that is wired in a place to which fluctuation and flection are applied, breaking of a conductor part and cracking of an insulating material part may be caused due to repeated flexing fatigue, and there is a possibility that disconnection of electric power signal or electric signal to be transmitted, formation of short circuit to ground or the like is caused.

In particular, in case of a cable that is used for power supply or signal transmission to an industrial robot or the like, the cable is wired in a severe environment for the cable, thus it is needed to more strictly prevent defects due to the breaking and the short circuit.

Incidentally, if cracks occur in the insulating material part of the cable, stress at the time of flection may be concentrated in the area of the cracks so as to allow the conductor part to be early broken by fatigue. In addition, if cracks occur in the insulating material part, it is considered that insulation between the conductor part and the surrounding part thereof may become insufficient, for example, the conductor part and a shield conductor may form a short circuit so as to lead to a serious accident. Consequently, it is important to constantly monitor an occurrence of cracks in the insulating material part, namely a damaged condition of the insulating material part during flection operation so as to ensure reliability of the whole system.

As a technique that is capable of constantly monitoring the damaged condition of the insulating material part, there is a technical idea disclosed in, for example, JP-A-2003-001433.

The cable damage detection device disclosed in JP-A-2003-001433 is configured such that an enclosed gas is enclosed in a gas layer formed between a conductor part and an insulating material part of a cable so as to detect whether the enclosed gas is decreased in pressure or not by a pressure gauge. If damages such as cracks occur in the insulating material part, gases flow out from the area of cracks, and the enclosed gas is decreased in pressure, so as to make it possible to constantly monitor the damages of the insulating material part by monitoring the pressure of the enclosed gas.

SUMMARY OF THE INVENTION

The device disclosed in JP-A-2003-001433 has a problem described below.

Namely, there is a problem that in order to use the device disclosed in JP-A-2003-001433, it is necessary to form a gas layer configured to enclose the enclosed gas between the conductor part and the insulating material part of the cable, thus it is needed for the cable to have a larger diameter for the gas layer.

Accordingly, it is an object of the invention to provide a cable condition monitoring device that is capable of constantly monitoring the damaged condition of the insulating material part of the cable without increase in diameter of the cable.

(1) According to one embodiment of the invention, a cable condition monitoring device for monitoring a damaged condition of a cable comprising a conductor part comprised of a plurality of element wires and an insulating material part formed on a periphery of the conductor part comprises:

a gas feeding device configured to feed a compressed gas into the conductor part;

a pressure gauge configured to measure a pressure in the conductor part; and an insulating material part damage judgment part configured to judge whether the insulating material part is damaged or not based on the pressure measured by the pressure gauge.

In the above embodiment (1) of the invention, the following modifications and changes can be made.

(i) The cable condition monitoring device further comprises:

a conductor powder amount measurement device configured to measure an amount of conductor powder generated by abrasion of the conductor part so as to be contained in the compressed gas discharged from the conductor part, and a conductor part abrasion judgment part configured to judge an abrasion condition of the conductor part based on the amount of conductor powder measured by the conductor powder amount measurement device.

(ii) The cable further comprises a terminal attached to each end of the cable and comprising a conductor part swaging part configured to swage and fix the cable inserted from a cable insertion opening and a gas feeding discharging opening configured to be communicated with the cable insertion opening internally so as to feed or discharge the compressed gas, wherein the gas feeding device is connected to the gas feeding discharging opening of one terminal and is configured to feed the compressed air into the conductor part via the one terminal, and wherein the conductor powder amount measurement device is connected to the gas feeding discharging opening of another terminal and is configured to measure the amount of conductor powder contained in the compressed gas discharged from the conductor part via the another terminal.

(iii) Two of the cables configured such that the terminal is mounted at each end thereof are wired in parallel to each other, wherein the gas feeding discharging openings of the one terminal mounted at one end of the two cables are connected to each other, and wherein the gas feeding device and the conductor powder amount measurement device are respectively connected to the gas feeding discharging openings of the another terminal of another end of the two cables.

(iv) The cable configured such that the terminal is mounted at each end thereof and a tube pipe are wired in parallel to each other, wherein one end of the tube pipe is connected to the gas feeding discharging opening of the one terminal mounted at the one end of the cable, and wherein the gas feeding device and the conductor powder amount measurement device are respectively connected to the gas feeding discharging opening of the another terminal mounted at the another end of the cable and another end of the tube pipe.

(2) According to another embodiment of the invention, a cable condition monitoring system comprises:

a cable comprising a conductor part comprised of a plurality of element wires and an insulating material part formed on a periphery of the conductor part;

a gas feeding device configured to feed a compressed gas into the conductor part;

a pressure gauge configured to measure a pressure in the conductor part, and an insulating material part damage judgment part configured to judge whether the insulating material part is damaged or not based on the pressure measured by the pressure gauge, wherein the cable further comprises a metal terminal attached to each end of the cable and comprising a conductor part swaging part configured to swage and fix the cable inserted from a cable insertion opening and a gas feeding discharging opening configured to be communicated with the cable insertion opening internally so as to feed or discharge the compressed gas, and wherein the gas feeding device is connected to the gas feeding discharging opening of one terminal and is configured to feed the compressed air into the conductor part via the one terminal.

(Points of the Invention)

According to one embodiment of the invention, a cable condition monitoring device is configured such that compressed gas is fed into a conductor part (i.e., spaces between the element wires of the conductor part) and damages of the insulating material part are judged from the pressure in the conductor part. Thus it is not needed to provide the gas layer as disclosed in the prior art, so that it becomes possible to constantly monitor the damaged condition of the insulating material part without using the cable with a larger diameter. In addition, a commonly-used cable can be used instead of the special cable, thus cost reduction of the whole system can be achieved.

BRIEF DESCRIPTION OF THE DRAWINGS

The preferred embodiments according to the invention will be explained below referring to the drawings, wherein:

FIG. 1A is an explanatory view schematically showing a configuration of a cable condition monitoring device according to one embodiment of the invention;

FIG. 1B is a transverse cross-sectional view schematically showing a cable used in the embodiment;

FIG. 1C is an explanatory view schematically showing a longitudinal cross-section of a terminal and a configuration for fixing the cable used in the embodiment; and FIGS. 2A and 2B are explanatory views schematically showing modifications of the cable condition monitoring device according to the embodiment of the invention.

DETAILED DESCRIPTION OF THE PREFERRED EMBODIMENTS

The preferred embodiments according to the invention will be explained below referring to the drawings.

FIG. 1A shows a rough configuration of the cable condition monitoring device according to the embodiment, FIG. 1B shows a transverse cross-section of a cable used in the embodiment, and FIG. 1C shows a longitudinal cross-section of a terminal and a configuration for fixing the cable used in the embodiment.

As shown in FIGS. 1A to 1C, the cable condition monitoring device 1 is a device that is configured to monitor a damaged condition of a cable 2, and includes a conductor part 3 comprised of a plurality of element wires and an insulating material part 4 formed on the outer periphery of the conductor part 3. Further, the above-mentioned "damaged condition of the cable 2" means a concept including existence or non-existence of occurrence of cracks in the insulating material part 4 and abrasion condition of the conductor part 3.

Here, a case that the cable 2 is used for power supply or signal transmission to an industrial robot or the like will be explained. However, not limited to this, the present invention can be applied to all the cables that are wired in a place to which fluctuation and flection are applied.

In the embodiment, as the cable 2, a cable is used that includes the conductor part 3 configured such that a plurality of element wires that have a circular shape in section are twisted together. However, the configuration of the cable 2 is not limited to this, but the element wire can have a non-circular shape in section, and the conductor part 3 can be configured such that the plurality of element wires are bundled together instead of being twisted together. In addition, as the cable 2, a cable can be also used that further includes an arbitrary layer formed on the outer periphery of the insulating material part 4. For example, as the cable 2, a coaxial cable configured such that a shield conductor and a sheath are successively formed on the outer periphery of the insulating material part 4 can be also used.

The cable condition monitoring device 1 according to the embodiment includes a gas feeding device 5 configured to feed a compressed gas into the conductor part 3, a pressure gauge 6 configured to measure a pressure in the conductor part 3, and an insulating material part damage judgment part 7 configured to judge whether the insulating material part 4 is damaged or not based on the pressure measured by the pressure gauge 6.

As the gas feeding device 5, a commonly-used positive displacement type pump or non-positive displacement type pump can be used. In the embodiment, the cable condition monitoring device 1 is configured such that a terminal 10 having a gas feeding discharging opening 11 configured to feed or discharge the compressed gas is mounted at each end of the cable 2 and the gas feeding device 5 is connected to the gas feeding discharging opening 11 of one terminal 10 (the terminal 10 located at left side in FIG. 1A).

The terminal 10 is formed such that a cable insertion opening 12 from which the cable 2 is inserted and a gas feeding discharging opening 11 are configured to be communicated with each other internally via a hollow part 16. An insulating material part swaging part 13 is formed adjacent to the cable insertion opening 12, and the cable 2 inserted from the cable insertion opening 12 is swaged and fixed by the insulating material part swaging part 13, thereby the terminal 10 is fixed at the end of the cable 2. In addition, a conductor part swaging part 14 configured to swage and fix the conductor part 3 extended from the end of the cable 2 is formed at the opposite side to the cable insertion opening 12 (at the side of the gas feeding discharging opening 11) of the insulating material part swaging part 13. The terminal 10 is comprised of metal, and the conductor part 3 is swaged and fixed by the conductor part swaging part 14, thereby the conductor part 3 and the terminal 10 are electrically connected to each other. At the fore-end of the terminal 10 (at the opposite side to the insertion side of the cable 2), a terminal part 15 having a plate-like shape configured to be connected to devices such as an industrial robot is integrally formed.

The gas feeding device 5 is connected to the gas feeding discharging opening 11, thereby the compressed air fed from the gas feeding device 5 is fed into the conductor part 3 of the cable 2 via the gas feeding discharging opening 11 and the hollow part 16, Further, in case that a plurality of element wires are used as the conductor part 3, spaces inevitably exist between the element wires of the conductor part 3, thus the compressed air is fed into the spaces.

The pressure gauge 6 is mounted on the terminal 10 located at the opposite side to the terminal 10 to which the gas feeding device 5 is connected, and is configured to measure the pressure in the conductor part 3 by measuring the pressure in the hollow part 16 of the terminal 10. Further, in order to detect an occurrence of cracks in the insulating material part 4 with high accuracy, it is preferable that the pressure in the conductor part 3 is set higher, thus it can be adopted to dispose a pressure adjustment device such as an orifice, a regulator in the gas feeding discharging opening 11 of the terminal 10 located at the opposite side to the terminal 10 to which the gas feeding device 5 is connected (at the discharge side of the compressed gas). Balance of the flow volume of the gas fed into and discharged from the conductor part 3 is appropriately adjusted by the gas feeding device 5 and the pressure adjustment device, thereby although the pressure in the conductor part 3 is slightly varies depending on the flection, it can be maintained approximately constant.

If cracks occur in the insulating material part 4 of the cable 2, the compressed air leaks from the cracks occurred so as to reduce the pressure in the conductor part 3. Consequently, in the embodiment, the insulating material part damage judgment part 7 is configured to judge that damages (cracks) occur in the insulating material part 4 if the pressure measured in the pressure gauge 6 becomes smaller than a predetermined set pressure threshold value. The insulating material part damage judgment part 7 is mounted on a control part 17 configured to control an industrial robot or the like.

In addition, the cable condition monitoring device 1 further includes a conductor powder amount measurement device 8 configured to measure a amount of conductor powder generated by abrasion of the conductor part 3 (namely, generated by that the element wires rub together due to flection) so as to be contained in the compressed gas discharged from the conductor part 3, and a conductor part abrasion judgment part 9 configured to judge an abrasion condition of the conductor part 3 based on the amount of conductor powder measured by the conductor powder amount measurement device 8.

The conductor powder amount measurement device 8 includes a conductor powder amount measurement part 81 comprised of a filter 81a configured to trap the conductor powders contained in the compressed gas discharged from the conductor part 3 and a differential pressure sensor 81b configured to measure a differential pressure between before and after the filter 81a, and a conductor powder amount operation part 82 configured to obtain the amount (weight, mass) of the conductor powders trapped by the filter 81a by operation. The conductor powder amount operation part 82 is mounted on the control part 17.

The conductor powder amount measurement part 81 of the conductor powder amount measurement device 8 is configured to be connected to the terminal 10 located at the opposite side to the terminal 10 to which the gas feeding device 5 is connected, and measure the amount of the conductor powders contained in the compressed gas discharged from the conductor part 3 via the terminal 10. Further, in the embodiment, the conductor powder amount measurement device 8 is configured to include the conductor powder amount measurement part 81 comprised of the filter 81a and the differential pressure sensor 81b, and the conductor powder amount operation part 82, but the configuration of the conductor powder amount measurement device 8 is not limited to this, if it can measure the amount of the conductor powders, any configuration can be adopted.

The more the degree of abrasion of the conductor part 3 is increased, the more the amount of the conductor powders measured at the conductor powder amount measurement device 8 is increased. Consequently, in the embodiment, the conductor part abrasion judgment part 9 is configured to judge that the conductor part 3 may be broken due to abrasion, if the amount of the conductor powders operated at the conductor powder amount operation part 82 becomes larger than a predetermined set conductor powder amount threshold value. Further, the conductor part abrasion judgment part 9 can be also configured to set the conductor powder amount threshold value in a step-by-step manner, and judge potential of breaking of the conductor part 3 due to the abrasion in a step-by-step manner. Furthermore, such a configuration can be also adopted that the differential pressure itself measured by the differential pressure sensor 81b is used as a parameter showing the amount of the conductor powder, instead of converting the differential pressure to the amount of the conductor powder. In this case, the conductor powder amount operation part 82 is omitted, and the conductor part abrasion judgment part 9 is configured to judge that the conductor part 3 may be broken due to abrasion, if the differential pressure becomes larger than a predetermined set differential pressure threshold value. The conductor part abrasion judgment part 9 is mounted on the control part 17.

Further, communications between the pressure gauge 6 or the differential pressure sensor 81b and the control part 17 can be carried out by cable, and can be also carried out by wireless.

The cable condition monitoring device 1 further includes an alarm part 18 configured to raise the alarm when the insulating material part damage judgment part 7 judges that damages occur in the insulating material part 4, and when the conductor part abrasion judgment part 9 judges that the conductor part 3 may be broken by abrasion. The alarm part 18 is configured to issue a warning to users by light or sound such as by outputting an abnormal annunciation signal so as to put on a fault indication lamp or the like. The alarm part 18 is mounted on the control part 17.

As explained above, the cable condition monitoring device 1 according to the embodiment includes the gas feeding device 5 configured to feed the compressed gas into the conductor part 3, the pressure gauge 6 configured to measure a pressure in the conductor part 3, and the insulating material part damage judgment part 7 configured to judge whether the insulating material part 4 is damaged or not based on the pressure measured by the pressure gauge 6.

In the conventional technique, gas is enclosed in a gas layer formed between a conductor part and an insulating material part, thus the cable is configured to have a larger diameter for the gas layer, in addition, it is necessary to use a cable having a special structure with the gas layer, thus costs are increased.

On the other hand, the cable condition monitoring device 1 is configured such that the compressed gas is fed into the conductor part 3 (spaces between the element wires of the conductor part 3) and damages of the insulating material part 4 are judged from the pressure in the conductor part 3, thus it is not needed to form the gas layer, so that it becomes possible to constantly monitor the damaged condition of the insulating material part 4 without making the cable 2 have a larger diameter. In addition, a commonly-used cable 2 can be used instead of a special cable, thus cost reduction of the whole system can be achieved.

Furthermore, the cable condition monitoring device 1 according to the embodiment further includes the conductor powder amount measurement device 8 configured to measure an amount of conductor powder generated by abrasion of the conductor part 3 so as to be contained in the compressed gas discharged from the conductor part 3 and the conductor part abrasion judgment part 9 configured to judge an abrasion condition of the conductor part 3 based on the amount of conductor powder measured by the conductor powder amount measurement device 8, This makes it possible to constantly monitor not only the damaged condition of the insulating material part 4 but also the abrasion condition of the conductor part 3 so that reliability of the whole system can be further enhanced.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, in the above-mentioned embodiment, the conductor powder amount measurement device 8 is connected to the gas feeding discharging opening 11 of the terminal 10 located at the opposite side to the terminal 10 to which the gas feeding device 5 is connected, but if the conductor powder amount measurement device 8 is omitted and only the damaged condition of the insulating material part 4 is monitored, a configuration can be also adopted that the compressed gas is fed from the gas feeding device 5 into the conductor part 3 and the hollow part 16 in a state of blocking one gas feeding discharging opening 11, and then another gas feeding discharging opening 11 is blocked and the gas feeding device 5 is removed.

In addition, in the above-mentioned embodiment, the gas feeding device 5 is connected to one end of the cable 2 and the conductor powder amount measurement part 81 is connected to another end of the cable 2, thus it is needed to respectively dispose the gas feeding device 5 and the conductor powder amount measurement part 81 in both ends of the cable 2. Therefore, in order to dispose both of the gas feeding device 5 and the conductor powder amount measurement part 81 together, a configuration shown in FIGS. 2A, 2B can be also adopted.

The cable condition monitoring device 21 shown in FIG. 2A has a configuration that two of the cables 2 configured such that the terminal 10 is mounted at each end thereof are wired in parallel to each other, the gas feeding discharging openings 11 of one terminal 10 mounted at one end (the end shown at the right side in FIG. 2A) of the two cables 2 are connected to each other by a gas relay tube 22, and the gas feeding device 5 and the conductor powder amount measurement device 8 (the conductor powder amount measurement part 81) are respectively connected to the gas feeding discharging openings 11 of another terminal 10 of another end (the end shown at the left side in FIG. 2A) of the two cables 2.

The cable condition monitoring device 21 is configured such that two cable 2 are connected to each other so as to allow the compressed gas to reciprocate, thereby the gas feeding device 5 and the conductor powder amount measurement part 81 can be disposed together.

The cable condition monitoring device 23 shown in FIG. 2B has a configuration that the cable 2 configured such that the terminal 10 is mounted at each end thereof and a tube pipe 24 are wired in parallel to each other, one end of the tube pipe 24 is connected to the gas feeding discharging opening 11 of the one terminal 10 mounted at the one end (the end shown at the right side in FIG. 2B) of the cable 2, and the gas feeding device 5 and the conductor powder amount measurement device 8 (the conductor powder amount measurement part 81) are respectively connected to the gas feeding discharging opening 11 of the another terminal 10 mounted at the another end (the end shown at the left side in FIG. 2B) of the cable 2 and another end of the tube pipe 24.

In FIG. 2B, a case that the gas feeding device 5 is connected to the side of the cable 2 and the conductor powder amount measurement part 81 is connected to the side of the tube pipe 24 is shown, but not limited to this, a case that the conductor powder amount measurement part 81 is connected to the side of the cable 2 and the gas feeding device 5 is connected to the side of the tube pipe 24 can be also adopted.

The cable condition monitoring device 23 is configured such that the tube pipe 24 is used for an outward pathway or a homeward pathway of the compressed gas, thereby the gas feeding device 5 and the conductor powder amount measurement part 81 can be also disposed together.

What is claimed is:

1. A cable condition monitoring device for monitoring a damaged condition of a cable comprising a conductor part comprised of a plurality of element wires and an insulating material part formed on a periphery of the conductor part, comprising:
    a gas feeding device configured to feed a compressed gas into the conductor part;
    a pressure gauge configured to measure a pressure in the conductor part; and
    an insulating material part damage judgment part configured to judge whether the insulating material part is damaged or not based on the pressure measured by the pressure gauge;
    a conductor powder amount measurement device configured to measure an amount of conductor powder generated by abrasion of the conductor part so as to be contained in compressed gas to be discharged from the conductor part; and
    a conductor part abrasion judgment part configured to judge an abrasion condition of the conductor part based on the amount of conductor powder measured by the conductor powder amount measurement device.

2. The cable condition monitoring device according to claim 1, wherein the cable further comprises a terminal attached to each end of the cable and comprising a conductor part swaging part configured to swage and fix the cable inserted from a cable insertion opening and a gas feeding discharging opening configured to be communicated with the cable insertion opening internally so as to feed or discharge the compressed gas,
    wherein the gas feeding device is connected to the gas feeding discharging opening of one terminal and is configured to feed the compressed air into the conductor part via the one terminal, and
    wherein the conductor powder amount measurement device is connected to the gas feeding discharging opening of another terminal and is configured to measure the amount of conductor powder contained in the compressed gas discharged from the conductor part via the another terminal.

3. The cable condition monitoring device according to claim 2, wherein two cables comprising the cable and another cable, configured such that the terminal is mounted at each end thereof are provided in parallel to each other,
    wherein the gas feeding discharging openings of the one terminal mounted at one end of the two cables are connected to each other, and
    wherein the gas feeding device and the conductor powder amount measurement device are respectively connected to the gas feeding discharging openings of the another terminal of another end of the two cables.

4. The cable condition monitoring device according to claim 2, wherein the cable configured such that a terminal is mounted at each end thereof and a tube pipe are provided in parallel to each other, wherein one end of the tube pipe is connected to the gas feeding discharging opening of the one terminal mounted at the one end of the cable, and wherein the gas feeding device and the conductor powder amount measurement device are respectively connected to the gas feeding discharging opening of the another terminal mounted at the another end of the cable and another end of the tube pipe.

5. A cable condition monitoring system, comprising:

a cable comprising a conductor part comprised of a plurality of element wires and an insulating material part formed on a periphery of the conductor part;

a gas feeding device configured to feed a compressed gas into the conductor part;

a pressure gauge configured to measure a pressure in the conductor part; and an insulating material part damage judgment part configured to judge whether the insulating material part is damaged or not based on the pressure measured by the pressure gauge, wherein the cable further comprises a metal terminal attached to each end of the cable and comprising a conductor part swaging part configured to swage and fix the cable inserted from a cable insertion opening and a gas feeding discharging opening configured to be communicated with the cable insertion opening internally so as to feed or discharge the compressed gas, and wherein the gas feeding device is connected to the gas feeding discharging opening of one terminal of the metal terminal attached to said each end of the cable and is configured to feed the compressed air into the conductor part via the one terminal.

\* \* \* \* \*